United States Patent [19]

Schuster et al.

[11] Patent Number: 5,064,908

[45] Date of Patent: Nov. 12, 1991

[54] OXIDIZED POLYETHYLENE AND USE AS LUBRICANT FOR POLYVINYLCHLORIDE

[75] Inventors: Ludwig Schuster, Limburgerhof; Albert Hettche, Hessheim; Werner Liedy, Hochdorf-Assenheim; Stefan Weiss, Neckargemuend; Leo Ehemann, Roedersheim-Gronau, all of Fed. Rep. of Germany

[73] Assignee: BASF Aktiengesellschaft, Ludwigshafen, Fed. Rep. of Germany

[21] Appl. No.: 608,621

[22] Filed: Nov. 6, 1990

Related U.S. Application Data

[63] Continuation of Ser. No. 420,686, Oct. 11, 1989, abandoned, which is a continuation of Ser. No. 206,839, Jun. 15, 1988, abandoned.

[30] Foreign Application Priority Data

Jun. 25, 1987 [DE] Fed. Rep. of Germany ....... 3720953

[51] Int. Cl.$^5$ .................... C08F 8/06; C08L 27/06; C08K 5/04
[52] U.S. Cl. .................. 525/333.8; 524/567; 525/239; 525/387; 525/388
[58] Field of Search ................ 525/239, 333.8, 388, 525/387; 524/567

[56] References Cited

U.S. PATENT DOCUMENTS

| | | |
|---|---|---|
| 3,234,197 | 2/1966 | Baum ............................. 525/326.6 |
| 3,293,112 | 12/1966 | Kehr . |
| 3,322,711 | 5/1967 | Bush . |
| 4,459,388 | 7/1984 | Hettche . |

FOREIGN PATENT DOCUMENTS

| | | |
|---|---|---|
| 951308 | 3/1964 | United Kingdom . |
| 997135 | 7/1965 | United Kingdom . |
| 1087914 | 10/1967 | United Kingdom . |
| 1087915 | 10/1967 | United Kingdom . |

OTHER PUBLICATIONS

Chem. Abst. 89, 75883m (1978).
Chemical Abstract 89:75,883m, vol. 89, p. 28 (1978).

*Primary Examiner*—Christopher Henderson
*Attorney, Agent, or Firm*—Keil & Weinkauf

[57] ABSTRACT

Oxidized polyethylenes useful as lubricants in the extrusion of polyvinyl chloride are prepared by oxidation of finely divided polyethylene of high density at elevated temperatures with an oxidation gas of air and/or oxygen, the polyethylene used containing from 0.015 to 0.5% by weight of a free radical former organic compound in admixture and being contacted per hour with an oxidation gas which per kilogram of polyethylene contains from 30 to 600, in particular from 80 to 300, mg of ozone, with or without a reduced pressure treatment at elevated temperatures after the oxidation.

3 Claims, No Drawings

OXIDIZED POLYETHYLENE AND USE AS LUBRICANT FOR POLYVINYLCHLORIDE

This application is a continuation of Ser. No. 07/420,686, filed Oct. 11, 1989, now abandoned which is a continuation of Ser. No. 07/206,839, filed June 15, 1988 now abandoned.

BACKGROUND OF THE INVENTION

1. Field of the Invention

The present invention relates to a process for preparing oxidized polyethylenes having acid numbers of from 10 to 40 mg of KOH/g by oxidation of a finely divided polyethylene of high density at below the softening point of the polyethylene and above 100° C. with an oxidation gas of air and/or oxygen, the polyethylenes used containing from 0.015 to 0.5% by weight of a free radical forming organic compound in admixture.

Such processes give oxidized polyethylenes which are of interest for use as lubricants in the extrusion of polyvinyl chloride.

2. Description of the Related Art

It is known that polyethylenes can be oxidized by the action of free oxygen at elevated temperatures, oxidized products being obtained through chain degradation. This method is described in U.S. Pat. Nos. 3,293,112, 3,322,711 and 4,459,388 and in GB Patent 1,087,915. The oxidation is in general carried out at temperatures just below the melting point of the polyethylene, on the one hand to obtain as high a rate of reaction as possible, but on the other to prevent sticking or clumping of the pulverulent product.

In these processes, an accelerant is used, in small amounts of for example 0.05 to 5% by weight, based on the polyethylene to shorten the induction period and to raise the rate of oxidation. The accelerants proposed are either organic peroxides or azobisisobutyronitrile and the peroxides, conveniently dissolved in an organic solvent, are to be distributed over the polyethylene. The solvent is then evaporated off before the oxidation. This gives a uniform distribution of the peroxide in the polyethylene.

The prior art also discloses converting polyethylene of high density with air in the presence of ozone into oxidized polyethylenes (cf. GB Patents 951,308, 997,135 and 1,087,914).

The existing processes for oxidizing polyethylenes using peroxide accelerators have the disadvantage that the acceleration of the oxidation reaction is only moderate. A more effective accelerant than peroxides, in particular dibenzoyl peroxide, is ozone, admixed in the oxidation gas, which is usually air. However, the oxidized products obtained with ozone are not suitable for use as lubricants in the extrusion of polyvinyl chloride, since their thermostability is not sufficient. In addition, the material obtained sticks too early to the rolls.

SUMMARY OF THE INVENTION

It is an object of the present invention to obtain a raised rate of reaction in the oxidation of polyethylene together with an improvement in the thermostability and in the stickiness, or rather nonstickiness, of the resulting oxidation product.

We have found that this object is achieved with a process as described at the beginning for oxidizing polyethylene in the presence of a defined amount of a free radical forming organic compound where, according to the invention, the polyethylene is contacted per hour with an oxidation gas which per kilogram of polyethylene contains from 30 to 600, preferably from 80 to 300, mg of ozone.

Preference is also given to a process where the oxidation is followed by reduced pressure treatment at elevated temperatures.

The oxidized polyethylenes obtained have acid numbers of from 10 to 40, preferably of from 10 to 22 mg of KOH/g. The acid numbers are obtained by titration in boiling xylene with methanolic or butanolic KOH against phenolphthalein, 1 g of oxidized polyethylene having been dissolved in from 100 to 200 g of xylene and the KOH solution being 1/10 normal. The oxidates obtained are usually light-colored heat-resistant waxes having a melting range of from 118° to 130° C. and melt indices, as measured by ASTM-D-1238-65T (190° C./2.16 kg), within the range from 0.1 to 7,000 g/10 min.

In the oxidation, a finely divided polyethylene of high density is used. For the purposes of the present invention, a finely divided polyethylene is a grainy, pulverulent or granular polyethylene having particle sizes within the range from 3 to 1,000, preferably from 300 to 800, micrometers. The polyethylene has a density of above 0.935 g/cm$^3$, in particular of from 0.94 to 0.97 g/cm$^3$ (by German Standard Specification DIN 53,479). The softening range of the polyethylene used is above 125° C., in particular within the range from 127° to 140° C. The polyethylene of high density can have been obtained for example from ethylene by Ziegler polymerization processes or by using Phillips catalyst systems. Suitable polyethylenes of high density have for example a melt flow index of above 0.01 g/10 min, as measured by ASTM-1D-1238-65T at 190° C. under a weight of 2.16 kg.

The oxidation temperatures are below the softening point of the particular polyethylene of high density and above 100° C., preferably above 120° C., in particular from 1° to 2° C. below the particular softening point of the polyethylene.

The oxidation gas consists as in the prior art of air, of any desired mixture of air and oxygen, or of oxygen.

The polyethylene shall contain from 0.015 to 0.5, preferably from 0.02 to 0.06, % by weight, based on the polyethylene, of a free radical forming organic compound in admixture. To this end, the free radical former is preferably mixed in with the polyolefin in a solid but finely divided form at the start of the oxidation. However, the free radical former can also, as commonly customary, be introduced into the polyethylene by means of a solvent. For the purposes of the present invention, free radical former organic compounds are organic peroxides which are solid at room temperature, such as di-tert-butyl peroxide, dibenzoyl peroxide, dilauroyl peroxide or tert-butyl perbenzoate, and azobisisobutyronitrile. The preferred compounds are dibenzoyl peroxide and dilauroyl peroxide. For the purposes of the invention, the free radical former should decompose into free radicals at temperatures below the softening temperature of polyethylene of high density within the duration of the oxidative treatment.

In the oxidation, the supply of the oxidation gas toward contact with the polyethylene shall be continuous. Suitable contact apparatus for this purpose comprises for example air through-circulation ovens, fluidized bed apparatus, hot moving beds, rotating drums or paddle dryers.

The reaction is best worked close to the softening point of the polyolefin, since it is there that the rate of oxidation is highest before clumping occurs. A paddle dryer is particularly suitable for this way of carrying out the reaction, since here the onset of softening is evident from an increase in the energy required for circulation, which fact can be utilized for temperature control. Temperature programs, which in any case never give perfect performance, thus become unnecessary. Suitable paddle dryers are described in Ullmann's Encyklopädie der technischen Chemie, Verlag Chemie, Weinheim/Bergstr., 4th edition (1972), volume 2, page 714; Kirk-Othmer, Encyclopedia of Chemical Technology, Interscience Publishers New York, 2nd edition (1965), vol. 7, pages 370 to 371, or in Grundriss der Technischen Chemie by F. A. Henglein, Verlag Chemie Weinheim/Bergstr., 11th edition (1963), pages 114 to 115.

According to the invention, the polyethylene shall be contacted per hour with an oxidation gas which per kilogram of polyethylene contains from 30 to 600, preferably from 80 to 300, in particular from 50 to 150, mg of ozone. The concentration of ozone in the oxidation gas, i.e. in the air, oxygen-enriched air or oxygen, is not very critical, since substantially all the ozone is consumed in the reaction. Customary values vary within the range from 2 to 6 g/m$^3$. The quantities of the two oxidation accelerants, for example organic peroxide and ozone, should not be chosen within arbitrary limits; on the contrary, only the ratios between the two compounds specified according to the invention result in success.

The advantages obtained with the invention are to be seen in particular in the fact that the combination of free radical forming organic compound, in particular dibenzoyl peroxide or dilauroyl peroxide, and ozone brings about an increased rate of reaction and at the same time an improvement in the thermostability and the stickiness/nonstickiness of the oxidized polyethylene.

DESCRIPTION OF THE PREFERRED EMBODIMENT

The oxidation at elevated temperatures is preferably followed by a pressure treatment of the oxidized polyethylene. Its duration can be within the range from 0.5 to 2 hours. The reduced pressure is advantageously within the range from 10 to 40 mbar, preferably within the range from 15 to 30 mbar.

The polyethylene oxidates were tested for their suitability as lubricant for polyvinyl chloride (PVC) as described hereinafter, the parts all being by weight. A mixture of
100 parts of suspension PVC (®Vinoflex S 6115),
1.2 parts of an organic tin stabilizer and
0.3 parts of polyethylene oxidate
is homogenized at 200° C. in a mixing mill comprising two rolls each 150 mm in diameter, which both rotate at 32 r.p.m. The nip is a uniform 0.3 mm wide.

The quantities measured are:
1. the time to the change in color from yellow to brown and
2. the time until the PVC begins to stick to the entire roll surface.

To determine the color, the sheet which emerges from the nip and which is constantly put back in, is blanked for a small disk, which is color-analyzed.

COMPARISON A

A glass flask of 2 liters (l) capacity is charged with 600 g of a finely grained polyethylene of density 0.945 g/cm$^3$. The flask is horizontally mounted by means of a rotary evaporation apparatus in such a way that half the flask dips into a heating bath. The oil of the bath is heated to 128° C., and the flask is set in rotation in such a way that the material to be oxidized is rotated at about 40–60 r.p.m. 50 l/hour of air and 8 l/hour of oxygen which contain 100 mg/hour of ozone are passed through a tube into the flask. 16 hours later the acid number is 15. During this time the temperature is lowered from an initial 128° C. to 125° C. at the end of the oxidation.

This is followed by two hours of drying at 125° C. under a reduced pressure of about 26 mbar.

The lubricant test gives a thermostability of 11–12 min at 200° C. and sticking after 13 min at 200° C.

COMPARISON B

The procedure of Comparison A is repeated, except that no ozone is introduced; instead 150 mg of dibenzoyl peroxide in finely divided, solid form have been mixed into the finely grained polyethylene before the start of the oxidation. The reaction in this case takes 22 hours to produce an acid number of 15.

Following the reduced pressure treatment the lubricant test gives the following values:
Thermostability: 10 min at 200° C.
Stickiness: after 15 min at 200° C.

EXAMPLE 1

The procedure of Comparison A is repeated, except that additionally with the introduction of ozone 150 mg of dibenzoyl peroxide have been added as in Comparison B before the start of the oxidation. In this case the reaction takes 15 hours to produce an acid number of 15.

Following the reduced pressure treatment the lubricant test gives the following values:
Thermostability: 11–12 min at 200° C.
Stickiness: over 16 min at 200° C.

EXAMPLE 2

The procedure of Example 1 is repeated using 300 mg of ozone per hour and 150 mg of dibenzoyl peroxide as in Comparison B. The reaction in this case takes only 10 hours to produce an acid number of 15.

Following the reduced pressure treatment the lubricant test gives the following values:
Thermostability: 11 min at 200° C.
Stickiness: over 16 min at 200° C.

COMPARISON C

Comparison B is repeated, except that the 150 mg of dibenzoyl peroxide are increased to 300 mg. The time required to obtain an acid number of 15 is 20 hours.

Following the reduced pressure treatment the lubricant test gives the following values:
Thermostability: 11 min at 200° C.
Stickiness: after 15 min at 200° C.

EXAMPLE 3

Comparison C is repeated, except that as in Comparison A an additional 100 mg of ozone per hour are introduced. In this case the reaction takes 15 hours to produce the desired acid number of 15.

Following the reduced pressure treatment the lubricant test gives the following values:
Thermostability: 11-12 min at 200° C.
Stickiness: over 16 min at 200° C.

EXAMPLE 4

In a 160 l capacity paddle dryer, 44 kg of a polyethylene of density 0.945 g/cm$^3$ in powder form and 22 g of dibenzyl peroxide are heated with churning. The stirrer shaft rotatates at 30-40 r.p.m. First a shell temperature of 130° C. is applied. Once the material to be oxidized is at 128° C., 2.8 m$^3$(S.T.P.) of air and 0.8 m$^3$(S.T.P.) of oxygen are simultaneously passed into the space per hour. This gas mixture contains 2.27 g/m$^3$(S.T.P.) of ozone. The temperature of the material undergoing oxidation is controlled by measuring the energy requirements of the stirrer motor in such a way as to keep just below the softening point. This softening point decreases during oxidation from 128° C. to 120° C. 14 hours later the acid number is 16.

Following a ½ hour reduced pressure treatment the lubricant test gives the following values:
Thermostability: 14 min at 200° C.
Stickiness: over 16 min at 200° C.

We claim:

1. A lubricant useful in the extrusion of polyvinyl chloride consisting essentially of oxidized polyethylene having an acid number of from 10 to 40 mg of KOH/g and obtained by
   (i) mixing finely divided polyethylene of high density with 0.015 to 0.5% by weight, based on the amount of the complete weight of the admixture, of a free radical forming organic compound, thereby obtaining a finely divided admixture,
   (ii) oxidizing the finely divided admixture at below the softening point of the polyethylene of high density and above 100° C. with an oxidation gas consisting essentially of air and ozone, oxygen and ozone, or air, oxygen and ozone in such a way that each kilogram of the polyethylene is contacted per hour with 30 to 500 mg of ozone, thereby obtaining the said lubricant.

2. A lubricated polyvinyl chloride composition which comprises polyvinyl chloride and an effective lubricating amount of at least one oxidized polyethylene having an acid number of from 10 to 40 mg KOH/g and obtained by
   (i) mixing finely divided polyethylene of high density with 0.015 to 0.5% by weight, based on the amount of the complete weight of the admixture, of a free radical forming organic compound, thereby obtaining a finely divided admixture, and
   (ii) oxidizing said finely divided admixture at below the softening point of the polyethylene of high density and above 100° C. with an oxidation gas consisting essentially of air and ozone, oxygen and ozone, or air, oxygen and ozone in such a way that each kilogram of the polyethylene is contacted per hour with 30 to 500 mg of ozone.

3. A method of lubricating polyvinyl chloride in the extrusion, the said method comprising the steps of
   (i) mixing finely divided polyethylene of high density with 0.015 to 0.5% by weight, based on the amount of the complete weight of the admixture, of a free radical forming organic compound, thereby obtaining a finely divided admixture,
   (ii) oxidizing the finely divided admixture at below the softening point of the polyethylene of high density and above 100° C. with an oxidation gas consisting essentially of air and ozone, oxygen and ozone, or air, oxygen and ozone in such a way that each kilogram of the polyethylene is contacted per hour with 30 to 500 mg of ozone, thereby obtaining an oxidized polyethylene having an acid number of from 10 to 40 mg of KOH/g and
   (iii) mixing the oxidized polyethylene with polyvinyl chloride.

* * * * *